United States Patent [19]

Swan et al.

[11] Patent Number: 5,773,375

[45] Date of Patent: Jun. 30, 1998

[54] THERMALLY STABLE ACOUSTICAL INSULATION

[76] Inventors: Michael D. Swan; Ruth A. Ebbens, both of P.O. Box 33427, St. Paul, Minn. 55133-3427

[21] Appl. No.: 655,047

[22] Filed: May 29, 1996

[51] Int. Cl.$^6$ .............................. D04H 1/56; D04H 1/00; D04H 13/00
[52] U.S. Cl. ...................... 442/340; 442/341; 442/344; 442/381; 442/394; 428/903
[58] Field of Search ................................. 442/341, 340, 442/344, 381, 394; 428/903

[56] References Cited

U.S. PATENT DOCUMENTS

| Re. 31,885 | 5/1985 | Meitner ................................. 252/91 |
|---|---|---|
| 3,382,305 | 5/1968 | Breen .................................. 264/176 |
| 3,546,063 | 12/1970 | Breen .................................. 161/176 |
| 3,773,605 | 11/1973 | Pihlstrom ............................. 161/43 |
| 3,849,241 | 11/1974 | Butin et al. .......................... 161/169 |
| 3,870,567 | 3/1975 | Palmer et al. ....................... 136/148 |
| 4,011,067 | 3/1977 | Carey, Jr. ............................. 55/354 |
| 4,038,228 | 7/1977 | Taylor .................................. 260/23 |
| 4,041,203 | 8/1977 | Bruck et al. ..................... 428/298 X |
| 4,048,364 | 9/1977 | Harding et al. ..................... 428/113 |
| 4,067,836 | 1/1978 | Potts et al. ........................ 260/23 H |
| 4,069,026 | 1/1978 | Simm et al. ............................. 55/6 |
| 4,118,531 | 10/1978 | Hauser ................................. 428/224 |
| 4,196,245 | 4/1980 | Kitson et al. .................... 428/297 X |
| 4,323,534 | 4/1982 | DesMarais .......................... 264/176 |
| 4,328,279 | 5/1982 | Meitner et al. ..................... 428/289 |
| 4,379,192 | 4/1983 | Wahlquist et al. .............. 428/903 X |
| 4,420,520 | 12/1983 | Jones et al. ........................... 428/42 |
| 4,420,526 | 12/1983 | Schilling et al. .................... 428/171 |
| 4,469,732 | 9/1984 | Isaksen et al. ........................ 428/80 |
| 4,551,378 | 11/1985 | Carey, Jr. ............................ 428/198 |
| 4,568,581 | 2/1986 | Peoples, Jr. ........................... 428/35 |
| 4,588,627 | 5/1986 | Isaksen et al. ........................ 428/80 |
| 4,588,635 | 5/1986 | Donovan ............................. 428/288 |
| 4,604,302 | 8/1986 | Isaksen et al. ..................... 427/208.6 |

(List continued on next page.)

FOREIGN PATENT DOCUMENTS

| 0 309 285 | 9/1988 | European Pat. Off. . |
|---|---|---|
| 0 375 781 | 11/1988 | European Pat. Off. . |
| 0484592 A1 | 5/1992 | European Pat. Off. . |
| 0 607 946 A1 | 1/1994 | European Pat. Off. . |
| 0 607 946A1 | 1/1994 | European Pat. Off. . |
| 25 43 781 | 4/1976 | Germany . |
| 2-271607 | 11/1990 | Japan . |
| WO 96/09428 | 3/1996 | WIPO . |

OTHER PUBLICATIONS

ASTM F 778–88, Standard Methods for Gas Flow Resistance Testing of Filtration Media.
Davies, C.N., "The Separation of Airborne Dust and Particles," Institute of Mech.
U.S. Defensive Publication T100,902 (Hauser).
3M Occupational Health & Environmental Safety Division, "3M Powersorb" brochure, Feb. 1991.
3M Occupational Health & Environmental Safety Division, "Powersorb Products" brochure, Jun. 1991.
3M Insulation and Specialty Fabrics, "Our New Insulation is Worth Its Lite Weight in Warmth" brochure, Jun. 1990.
3M Insulation and Specialty Fabrics, "Thinsulate Family of Products" brochure, Aug. 1992.
3M "Thinsulate Lite Loft" brochure produced for Outdoor Retailers Trade Show, Feb. 1992.
Report No. 4364 Naval Research Laboratories, publ. May 25, 1954, "Manufacture of Superfine Organic Fibers" by Wente, Van A. et al.
Wente, Van A. "Superfine Thermoplastic Fibers" in Industrial Engineering Chemistry, vol. 48, p. 1342 et seq. (1956.

*Primary Examiner*—Kathleen Choi
*Attorney, Agent, or Firm*—Gary L. Griswold; Walter N. Kirn; William J. Bond

[57] ABSTRACT

There is provided thermally stabilized polypropylene melt-blown microfiber acoustical insulation web which has a resistance to thermal degradation at a temperature of 135° C. for at least 10 days. The polypropylene has a thermal stabilizer uniformly distributed within the melt-blown microfiber polymer which polymer when produced is subject to thermal and/or catalytic degradation in the absence of significant levels of thermal stabilizer or antioxidant.

17 Claims, 1 Drawing Sheet

U.S. PATENT DOCUMENTS

| | | | |
|---|---|---|---|
| 4,696,848 | 9/1987 | Jones et al. | 428/80 |
| 4,707,398 | 11/1987 | Boggs | 428/224 |
| 4,753,843 | 6/1988 | Cook et al. | 428/286 |
| 4,813,948 | 3/1989 | Insley | 604/366 |
| 4,828,910 | 5/1989 | Haussling | 428/284 |
| 4,837,067 | 6/1989 | Carey, Jr. et al. | 428/108 |
| 4,851,283 | 7/1989 | Holtrop et al. | 428/284 |
| 4,859,512 | 8/1989 | Jones et al. | 428/40 |
| 4,865,791 | 9/1989 | Ferro et al. | 264/134 |
| 4,873,132 | 10/1989 | Jones et al. | 428/80 |
| 4,883,549 | 11/1989 | Frost et al. | 156/161 |
| 4,933,229 | 6/1990 | Insley et al. | 428/224 |
| 4,981,747 | 1/1991 | Morman | 428/198 |
| 4,992,327 | 2/1991 | Donovan et al. | 428/296 |
| 5,064,578 | 11/1991 | Insley et al. | 264/12 |
| 5,073,436 | 12/1991 | Antonacci et al. | 428/903 X |
| 5,116,662 | 5/1992 | Morman | 428/198 |
| 5,118,722 | 6/1992 | Wollmann et al. | 521/137 |
| 5,122,593 | 6/1992 | Jennings et al. | 524/100 |
| 5,145,727 | 9/1992 | Potts et al. | 428/198 |
| 5,149,468 | 9/1992 | Hershelman | 264/12 |
| 5,271,883 | 12/1993 | Timmons et al. | 264/6 |
| 5,286,929 | 2/1994 | Kazama et al. | 181/286 |
| 5,288,791 | 2/1994 | Collier, IV et al. | 524/505 |
| 5,298,694 | 3/1994 | Thompson et al. | 181/286 |
| 5,393,831 | 2/1995 | Hudson | 525/55 |
| 5,437,922 | 8/1995 | Jackson et al. | 428/288 |
| 5,459,291 | 10/1995 | Haines et al. | 181/286 |
| 5,480,466 | 1/1996 | Jackson et al. | 55/528 |

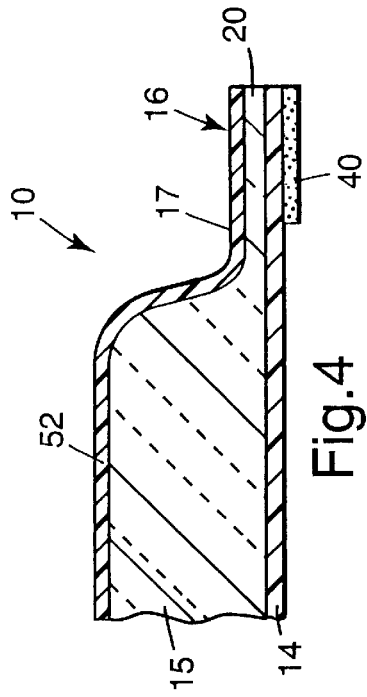
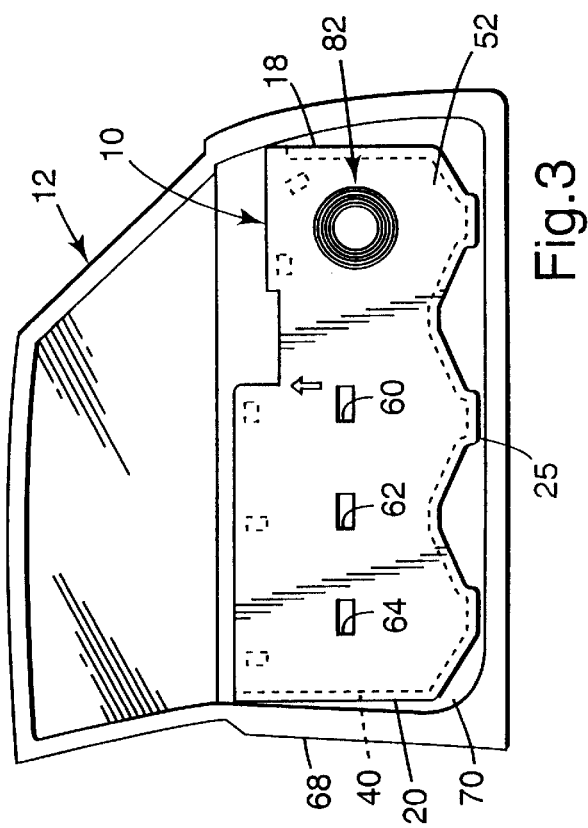
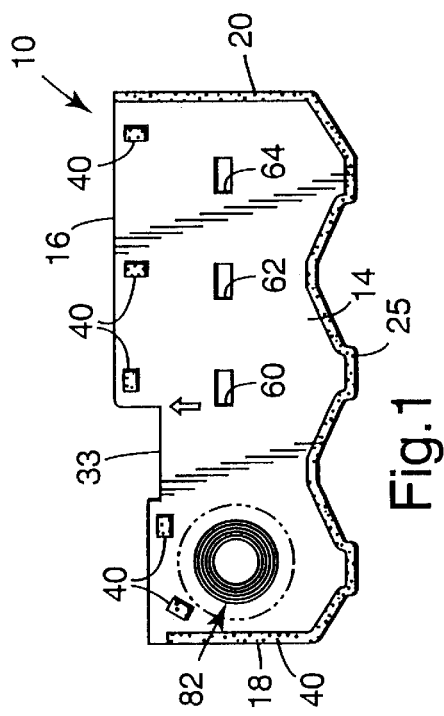
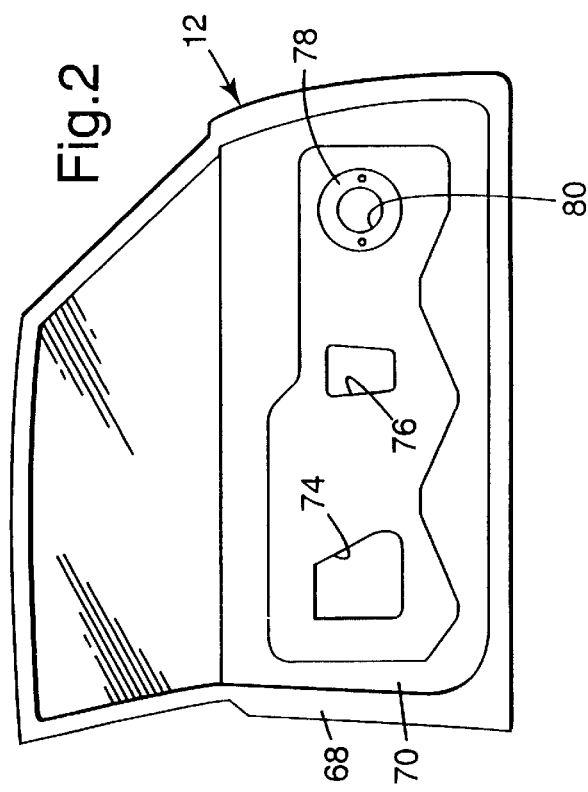

THERMALLY STABLE ACOUSTICAL INSULATION

BACKGROUND AND FIELD OF THE INVENTION

The invention relates to acoustical insulation particularly designed for use in a motorized vehicle, particularly an automobile.

Nonwoven webs are used in automotive vehicles as an acoustical insulation located in and surrounding the passenger cabin and/or the engine compartment or fire wall. For use in the engine compartment or adjacent fire wall, generally an extremely high temperature stable nonwoven material is required such as mineral wool, fiberglass and the like. However, even around the passenger cabin a certain degree of resistance to thermal degradation is required. The passenger compartments of vehicles can become quite hot, particularly when parked in a sunny location.

It has been found that an extremely efficient acoustical insulation material can be formed by the melt-blown microfiber process, which material is described in U.S. Pat. No. 5,298,694. In terms of cost, processability and performance a preferred blown microfiber web for this use is formed out of polypropylene. However, the problem with polypropylene in the fiber form is that it is susceptible to degradation, particularly thermal degradation.

Polypropylene when it degrades becomes brittle and when in the form of a blown microfiber turns into dust. For example, in U.S. Pat. No. 4,067,836 polypropylene is used to enhance the degradability of a polymer blend by increasing the susceptibility of the blend to be oxidatively degraded. In order to stabilize the polymer composition for a given time period, after which point degradation rapidly occurs, this patent proposes the use of phenol-like antioxidants and others. Similarly, U.S. Pat. No. 5,393,831 describes polypropylene films and fibers which are formed without any phenolic antioxidants. The resulting material is designed to rapidly degrade when exposed to a high temperature environment, see also U.S. Pat. No. 4,038,228.

The exact nature by which any given thermal stabilizer or blend of stabilizers works in any particular instance is often not well understood. However, most if not all thermal stabilizers are considered to be sacrificial. In this sacrificial sense, the stabilizers will preferentially remove essential components involved in the degradation process and are depleted in the process. When all the stabilizers are depleted, the protected materials will then generally rapidly degrade. Further, if the antioxidants or thermal stabilizers are not well distributed throughout the polymer localized degradation can occur. This problem can be compounded where the antioxidants tend to segregate due to incompatibility and/or are of a lower molecular weight such that the stabilizers can migrate and volatilize during use of the article.

Additives, including antioxidants or thermal stabilizers and other conventional additives, are typically added to a polymer prior to feeding the polymer into the extruder when forming either films or fibers. This is also true with respect to melt-blown microfibers as is described in U.S. Pat. No. 5,145,727 and German laid-open publication No. 254378, both of which describe adding additives to polypropylene prior to extrusion and melt-blowing of the fibers. In U.S. Pat. No. 5,145,727 the additives are materials which preferentially migrate to the surface of the melt-blown microfibers. These additives provide specific surface characteristics to the melt-blown microfibers including hydrophilicity, water wettability, alcohol repellency, hydrophobicity, antistatic properties and the like. These types of additives have also been described as sprayed onto the surface of fibers following formation of the melt-blown microfiber web, for example, in U.S. Pat. Nos. 4,753,843; 4,328,279 and RE 31,885.

A very common additive added prior to extrusion of polypropylene in a melt-blowing process is a prodegradent material such as peroxide, see, e.g., WO 96/09428. These peroxides are used to controllably degrade the polypropylene during the extrusion process to provide a suitable molecular weight distribution so as to allow the polypropylene to be efficiently melt-blown into high quality microfiber webs. For example, U.S. Pat. No. 5,271,883 describes peroxides used at levels up to 3000 parts per million in order to control the molecular weight distribution of polypropylene to a range of from 2.2 to 3.5 Mw/Mn and providing a melt flow rate of up to 5000 grams per ten minutes at 230° C. If these peroxides are not added, or sometimes in conjunction with peroxides, polypropylene is generally subject to a controlled thermal degradation in the extruder, as is described in U.S. Pat. Nos. 3,870,567; 4,048,364; 3,849,241 and 5,149,468. This thermal degradation is carried out at quite extreme temperatures as discussed in detail in U.S. Pat. No. 3,849,241. Both forms of degradation help to eliminate the formation of shot or other fiber defects in the melt-blown microfiber web. This controlled degradation also enables the use of higher viscosity and low melt flow rate polypropylene polymers to produce high quality melt-blown nonwoven webs which have average fiber diameters of preferably less than 10 microns. The addition of thermal stabilizers in polymers fed into this control degradation environment would be counter productive. The result would likely be a non-degraded polymer which would produce a lower quality melt-blown nonwoven web with little thermal stability in that all or a substantially all of the antioxidant or thermal stabilizer would be consumed in the extreme degradation environment of the extruder.

German patent No. 25 43 781 proposes thermal degradation where a non-toxic surfactant is used to aid degradation allowing slightly lower thermal degradation temperatures.

The use of antioxidants has been suggested with respect to melt-blowing fibers from polymers which initially have suitable viscosities for melt-blowing. These antioxidants are fed with the polymer into the extruder such as described in Japanese Kokai No. 2-271607, European patent application No. 484952 and U.S. Pat. Nos. 5,288,791; 4,981,747; 5,116,662; 5,169,706; 4,883,549 and 4,707,398.

SUMMARY OF THE INVENTION

The present invention relates to the use of thermally stabilized polypropylene melt-blown microfiber acoustical insulation webs for sound attenuation. The webs exhibit superior acoustical properties, namely sound absorption and transmission loss properties. Sound absorption relates to the ability of a material to absorb incident sound waves, while transmission loss relates to the ability of a material to reflect incident sound waves. High sound absorption and high transmission loss values are considered desirable for acoustical insulation. The term "sound attenuation" refers to absorption and/or reflection of incident sound waves.

For acoustical insulation used in a motor vehicle passenger cabin it is desired to have a polypropylene melt-blown microfiber nonwoven web material which has a resistance to thermal degradation (thermal stability) at a temperature of 135° C. for at least 10 days, preferably 50 days, most preferably 100 days where the antioxidant or thermal stabilizer is uniformly dispersed within the polypropylene melt-blown microfiber polymer. Preferably, the amount of antioxidant or thermal stabilizer added to the polymer feedstream prior to forming the melt-blown microfiber web acoustical insulation, substantially corresponds to that found in the final insulation product. The antioxidant or thermal stabilizer is also added so that it does not interfere with any controlled thermal or prodegradent catalyzed degradation of the polypropylene during the extrusion process efficiently producing a melt-blown microfiber web which is substantially shot-free and has an average effective fiber diameter of less than about 15 microns.

The invention further relates to an acoustical insulation comprising thermoplastic melt-blown microfibers wherein the acoustical insulation web has an average effective fiber diameter of less than about 15 microns, a density of less than about 20 kg/m$^3$, and an air flow pressure drop of at least about 1 mm water at a flow rate of about 32 liters/min (as outlined in ASTM F 778-88).

Preferably, the average effective fiber diameter of the acoustical insulation web is about 1 to 10 microns, the density of the web is less than about 10 kg /m$^3$, and the pressure drop of the web is about 3 mm water to about 10 mm water at a flow rate of about 32 liters/min. and the polypropylene microfibers have at least 0.2 weight percent of a non-volatile (at temperatures up to 130° C.) antioxidant or thermal stabilizer uniformly dispersed within the microfibers.

Further, the acoustical insulation web preferably comprises a mixture of the polypropylene melt-blown microfibers and crimped bulking fibers such that the melt-blown microfibers form at least 40 weight percent of the nonwoven acoustical insulation web. Also, the nonwoven acoustical insulation web can comprises very fine denier staple fibers having deniers of about 2 or less as well as additional staple fibers such as binder fibers and static discharge fibers.

In yet another aspect of the invention, there is provided an acoustical insulation web laminate comprising:

a) a nonwoven acoustical insulation web comprising at least 40 weight percent thermally stabilized thermoplastic melt-blown microfibers as described above; and b) a second layer laminated to the acoustical insulation web to form the laminate, wherein portions of the acoustical insulation web and the second layer can be thermally consolidated to form reduced thickness areas which are of a thin gauge relative to other portions of the laminate.

Typically, the second layer would comprise a scrim, a nonwoven fibrous web, a film or a woven fabric.

BRIEF DESCRIPTION OF DRAWING

The invention will be further explained with reference to the drawing, wherein:

FIG. 1 is a side view of a laminate of the invention, showing the thermoplastic film side of the laminate;

FIG. 2 is a diagrammatical elevational view of the inner panel of a vehicle door;

FIG. 3 is a view similar to FIG. 2 but showing the laminate of FIG. 1 in position on the inner panel of a vehicle door and illustrating the nonwoven side of the laminate.

FIG. 4 is an enlarged diagrammatical cross section of FIG. 1.

These figures, which are idealized, are not to scale and are intended to be merely illustrative and nonlimiting.

DETAILED DESCRIPTION OF PREFERRED EMBODIMENTS

The nonwoven acoustical insulation web of thermally stabilizing melt-blown polypropylene microfibers typically has a density of about 50 kg/M$^3$ or less, preferably about 20 kg/M$^3$ or less; an average effective fiber diameter of about 15 microns or less, preferably about 1 to about 10 microns and a pressure drop of at least about 1 mm water at a flow rate of about 32 liters/min., preferably at least about 3 mm water, most preferably about 3 to about 10 mm water.

Melt-blown microfiber webs can be formed as described in Wente, Van A. "Superfine Thermoplastic Fibers" in *Industrial Engineering Chemistry*, vol. 48, pages 1342 et seq. (1956) or in Report No. 4364 of the Naval Research Laboratories, published May 25, 1954, entitled "Manufacture of Superfine Organic Fibers" by Wente, Van A., Boone, C. D. and Fluharty, E. L. The aspect ratio (ratio of length to diameter) of the melt-blown microfibers could approach infinity, although melt-blown microfibers are known to be discontinuous. The melt-blown microfibers are generally about 1 to about 25 microns in diameter. In webs according to the present invention, the average effective diameters of the melt-blown microfibers are preferably about 1 to about 15 microns, more preferably about 3 to 10 microns. The melt-blown microfibers are formed from polypropylene fiber-forming thermoplastic polymers generally comprising polypropylene homopolymers, copolymers and blends (generally termed polypropylene unless otherwise indicated). The polypropylene homopolymer or copolymer comprises at least 50 weight percent of the microfiber and can be blended with other thermoplastic materials compatible for melt-blowing. Generally preferred would be blends with compatible polyolefins. However, blends as a whole are generally less preferred.

The invention acoustical insulation webs of melt-blown polypropylene microfibers may also contain staple fibers such as crimped bulking fibers as disclosed in U.S. Pat. No. 4,118,531 (Hauser) or binder fibers. Such crimped bulking fibers have a continuous wavy, curly or jagged character along their length. The size of the crimped bulking fiber is generally in the range of about 1 denier to about 100 denier, preferably about 3 to about 35 denier. Typically, the crimped bulking fibers have an average length of about 2 to about 15 cm, preferably about 7 to about 10 cm. The crimped bulking fibers can be formed from polyesters, acrylics, polyolefins, polyamides, polyurethanes, rayons, acetates and mixtures thereof.

Typical binder staple fibers include amorphous meltable fibers, or hot melt adhesive-coated fibers which may be discontinuously coated and bicomponent binder fibers which have an adhesive component and a supporting component arranged in a coextensive side-by-side, concentric sheath-core or elliptical sheath-core configuration along the length of the fiber with the adhesive component forming at least a portion of the outer surface of the fiber. Useful binder fibers are disclosed in U.S. Pat. No. 4,837,067 (Carey, Jr. et al.). A preferred binder fiber comprises a crimped sheath-core bonding fiber having a core of crystalline polyethylene terephthalate surrounded by a sheath of an adhesive polymer formed from isophthalate and terephthalate esters available as Melty® fibers from Unitika Corporation of Osaka, Japan. A usable bicomponent polyethylene-polypropylene fibers available as Chisso® ES fibers from Chisso Corporation of Osaka, Japan.

The amount of crimped bulking fibers and/or binder fibers can vary widely depending on the size of the fibers and the amount of increased bulk provided by the fibers. The amount must be such that the required density, average effective fiber diameter and pressure drop are met. For example, in an acoustical insulation web formed from polypropylene melt-blown microfibers having an average effective fiber diameter of about 6 microns and polyester staple fibers having a denier of about 6, a length of about 1.5 inches (3.8 cm) and about 3.9 crimps/cm, the ratio of melt-blown microfibers to crimped bulking fibers in the acoustical insulation web could be in the range of about 40:60 to about 95:5, respectively.

Acoustical insulation webs used in the invention may also contain microfiber microwebs as disclosed in U.S. Pat. No. 4,813,948 (Insley). Microfiber microwebs are typically prepared by divellicating a microfiber source web to form discrete particles of microfiber microwebs. Such microfiber microwebs have relatively dense nuclei with individual fibers and/or fiber bundles protruding therefrom. The nuclei have an average diameter of about 0.05 to about 4 mm and the fibers and/or fiber bundles extend outwardly to provide a total diameter of the microweb in the range of about 0.07 to about 10 cm. These microwebs if formed of polypropylene microfibers are preferably heat stabilized in accordance with the invention.

The basis weight of the acoustical insulation web can vary widely depending on the desired end use but typically the web will have a basis weight of at least about 100 g/m$^2$, more preferably at least about 200 g/m$^2$. The thickness of the acoustical insulation web can also vary widely but typically is in the range of about 0.5 cm to about 15 cm, preferably is at least about 2 cm, more preferably at least about 7 cm. The thickness of the web can be reduced as necessary to achieve the required density as, for example, by calendaring. Thickness is measured by taking a 10 cm by 10 cm section of web, cut and weighed to the nearest 0.01 gram, and then placed under a flat plate with a weight of 40 kilograms (providing a pressure of 0.4 kilogram/square centimeter) for 24 hours, at which time the weight is removed and the sample allowed to recover undisturbed for 1 hour. The height is then measured using a plate and dial indicator exerting a total force of 14 gram (pressure of $1.4 \times 10^{-4}$ kilogram/square centimeter) on the web. From the weight and the thickness, the loft is easily calculated from the following equation:

$$L=(h)(100)/W$$

where:
L=loft in cubic centimeter/gram
h=thickness in centimeter
W=weight of 10-centimeter by 10-centimeter sample.

The nonwoven acoustical insulation web can further comprise a second layer laminated thereto to form a laminate. Preferably, the second layer comprises a liquid barrier thermoplastic film. In use, typically the second layer faces the sound receiving area.

In a preferred embodiment, the invention relates to an acoustical insulation laminate 10 illustrated in FIG. 1 which is adapted to be secured to the interior panel of, for example, a vehicle such as vehicle door 12 illustrated in FIG. 2. The laminate 10 has desirable acoustical insulation properties and can also act as a water shield or barrier to prevent water from entering a vehicle body. Although the laminate 10 is described with specific reference to its preferred use in a vehicle it is to be appreciated that the laminate 10 has broader applications and could be equally adapted for use in providing acoustical insulating and water barrier properties to other articles, such as small appliances or architectural applications.

Referring to FIG. 4, the laminate 10 preferably includes a water barrier layer such as a planar thermoplastic film 14 formed of a relatively thin thermoplastic material. Although the film 14 can comprise a variety of thermoplastic materials, it has been found that the strength, flexibility and durability of polyolefins makes them preferred materials for use as the film 14; polyethylene, polypropylene and ethylene-propylene copolymer films are particularly preferred with suitable levels of thermal stabilizers added by conventional techniques. In addition, although the film 14 could be of a variety of thicknesses, it preferably has a thickness in the range of between about 20 microns and about 250 microns, and most preferably of between about 25 microns and about 150 microns.

In the laminate 10 the melt-blown polypropylene acoustical insulation web 15 is laminated to the thermoplastic film 14. The web 15 preferably comprises polypropylene melt-blown microfibers and crimped bulking fibers which are thoroughly mixed.

If desired, the laminate 10 can include an optional scrim layer 52 secured to the web 15 opposite the film 14. The optional scrim layer 52 increases the integrity of the laminate 10. The scrim layer 52 can comprise a 17 g/m$^2$ polypropylene spunbond nonwoven scrim material having a thickness of about 180 microns which is available from Fiberweb North America, Inc. (Greenville, S.C.) under the trade name Celestra®.

The laminate 10 is typically made by first forming the web 15 in situ on the optional scrim layer 52 by placing the scrim layer 52 on the web collector surface prior to collecting the microfibers of the web 15 on the web collector surface. Next, web 15 can be subjected to a conventional calendaring or ultrasonic point bonding operations to laminate the film 14 to the web 15 composite and thus form the laminate 10. Alternatively, the laminate 10 can be made by securing the layers of the laminate together with an adhesive, e.g., a hot melt or pressure-sensitive adhesive, or a double-sided adhesive tape comprising such an adhesive. In addition, if desired, a second optional scrim layer (not shown) can be secured between the film 14 and the web 15.

Next, the laminate 10 is typically pressure molded in a heated die (i.e., thermoformed) to form reduced thickness areas 17 along its outer periphery 16, of approximately 20 mils (508 microns) in thickness. In the thermoforming process, the laminate 10 is preferably subjected to a clamping force of about 90 tons over a 4 ft$^2$ (0.4 m$^2$) area at a temperature of about 250° F. (120° C.) for about 1.2 minutes. In the reduced thickness areas 17, the film 14, web 15 and optional scrim layer 52 are thermally consolidated to form an integral structure of a thin gauge. The reduced thickness areas 17 promote the integrity of the laminate 10 in those areas and permit the laminate 10 to be easily handled by vehicle manufacturers during assembly operations. The areas of the laminate 10 that do not contact the die surface during the thermoforming operation are actually unaltered in web thickness. In these areas of the laminate 10, the acoustical insulating properties of the web 15 are not affected. Optionally, areas of the laminate 10 inside the outer periphery 16 can also be thermally consolidated to a thin gauge to accommodate the contours of a vehicle door.

In another of its aspects, the invention relates to an acoustical insulation laminate comprising:
  a) a nonwoven acoustical insulation web 15 comprising thermally stabilized melt-blown polypropylene microfibers; and
  b) a second layer such as the film 14 laminated to the web 15 to form the acoustical insulation laminate, wherein portions of the web 15 and the second layer have been thermally consolidated to form reduced thickness areas, such as the reduced thickness area 17, which are of a thin gauge relative to other portions of the laminate.

Referring to FIG. 1, in the embodiment illustrated, the acoustical insulation laminate 10 includes side edges 18 and 20, bottom edge 25 and top edge 33. To allow the laminate 10 to be attached to the surface to be protected, the film 14 of the laminate 10 can have adhesive 40 applied to selected areas thereof after the laminate 10 is thermoformed as described above. If desired, the surface of the, e.g., film 14 to which the adhesive is to be applied can be treated prior to applying the adhesive to modify the surface characteristics of the film surface for enhancing bonding of the adhesive to the film 14. Corona discharge treatment is preferred for this purpose.

Further, in yet another of its aspects, the invention relates to a process for manufacturing a vehicle door or other body panel, wherein the laminate 10 is secured to the inner panel of, e.g., a vehicle door to provide acoustical insulation for the vehicle door and to act as a water barrier.

A vehicle door 12, such as shown in FIG. 2, is generally conventional and comprises an outer panel 68. An inner panel 70 is suitably secured to the outer panel 68 such as by welding along the peripheral edge of the inner panel 70. Typically, the panels are spaced to provide an internal channel for accommodating various internal window operating mechanisms and the like. For this reason, the inner panel 70 is generally formed with an uneven shape or contour for accommodating and mounting various accessories or the like, for example, in FIG. 2 a speaker opening 80 is formed through the recessed area 72 of the inner panel 70 centrally of the generally cylindrical portion 78. FIG. 3 illustrates the laminate 10 in its installed position on the door 12.

The polypropylene melt-blown microfibers of the acoustical insulation web are characterized by having substantial resistance to thermal degradation such that they are resistant to thermal degradation at a temperature of at least 135° C. for at least 10 days or at a temperature of at least 155° C. for at least 5 days, preferably at least 10 days, most preferably 30 days. This reasonably corresponds to an accelerated version of an approximate thermal history for an average automobile lifetime, which automobile would be used in an average hot tropical or arid environment. However, typically in use the highest average temperatures that an acoustical insulation web in the automotive passenger compartment would be exposed to would be well below 120° C.

The thermal stability of the polypropylene melt-blown microfibers is due to use of a suitable nonvolatile stabilizer uniformly distributed throughout the microfibers of the polypropylene melt-blown web. Any suitable non-volatile heat stabilizer can be used such as phenol antioxidants such as hindered phenols such as di-n-octadecyl(3,5-di-butyl-4-hydroxybenzyl)malonate; 2,6-di-t-butylphenol; 2,2'-methylene-bis(6-butyl-4-methylphenol); 2,6-di-t-butylhydroquinone; octadecyl(3,5-di-t-butyl-4-hydroxybenzylthio) acetate; 1,1,3-tris(3-t-butyl-6-methyl-4-hydroxyphenyl) butane; 1,4-bis(3,5-di-t-butyl-4-hydroxybenzyl)-2,3-5,6-tetramethylbenzene; 2,4-bis-(3,5-di-t-butyl-4-hydroxyphenoxy)-6-(n-octyl-thio)-1,3,5-triazine; 2,4-bis-(4-hydroxy-3,5-di-t-butylphenoxy)-6-(n-octyl-thioethylthio)-1,3,5-triazine; 2,4-bis-(n-octylthio)-6-(3,5-di-t-butyl-4-hydroxy-anilino)-1,3,5-triazine; 2,4,6-tris-(4-hydroxy-3,5-di-t-butylphenoxy)-1,3,5-triazine; n-octadecyl-beta -(3,5-di-t-butyl-4-hydroxyphenyl) propionate; 2,4,6-tris(3,5-di-tert-butyl-4-hydroxybenzyl)-isocyanurate; di-n-dodecyl-6-tert-butyl-2,3-dimethyl-4-hydroxybenzyl phosphonate; stearamido N,N-bis-[ethylene 3-(3,5-di-t-butyl-4-hydroxyphenyl) propionate]; 1,2-propylene glycol bis [3-(3,5-di-t-butyl-4-hydroxyphenyl) propionate]; pentaerythritol tetrakis-[3-(3,5-di-t-butyl-4-hydroxyphenyl)propionate]; dioctadecyl-3,5-di-t-butyl-4-hydroxybenzylphosphonate; di-n-octadecyl-1-(3,5-di-t-butyl-4-hydroxyphenyl)-ethanephosphonate; tetrakis [methylene-3-(3',5'-di-tert-butyl-4'-hydroxyphenyl propionate]methane; stearyl 3-(3',5'-di-tert-butyl-4'-hydroxyphenyl)-propionate; distearyl 3,5-di-tert-butyl-4-hydroxybenzyl phosphite; 1,1,3-tris(5'-tert-butyl-4'-hydroxy-2'-methyl-phenyl)butane; 4-methyl-1,6-di(2'-hydroxy-3'-tert-butyl-5'-methylbenzyl)phenol; 2,4-di(3',5'-di-tert-butyl-4'hydroxyphenoxy)triazine; 2,2'-thiobis(4'-methyl-6'-tert-butyl-phenol); 4,4'-thiobis(3-methyl-6-tert-butyl-phenol); 3,5-di-tert-butyl-4-hydroxyanisole; 2,6-di-tert-butyl-p-cresol(tetrakis[methylene(3,5-di-tert-butyl-4-hydroxyhydrocinnamate). Also suitable are amine antioxidants such as N-phenyl-beta-naphthylamine; N,N'-diphenyl-p-phenylenediamine; p-isopropoxy diphenylamine; N,N'-di-beta-naphthyl-p-phenylenediamine; N,N'-di-(2-octyl)-p-phenylenediamine; N,N'-di-3(5-methylheptyl)-p-phenylenediamine; aldol-alpha-naphthylamine; 4,4'-dioctyldiphenylamine; 4-octyldiphenylamine; 4-t-butoxydiphenylamine; the polymer of 1,2-dihydro-2,2,4-trimethylquinoline; and the like.

Other conventional antioxidants includes thioureas, phosphites, phosphates and other conventional antioxidants.

The antioxidants or thermal stabilizers are present in the polypropylene melt-blown microfibers at a concentration sufficient to thermally stabilize the polypropylene microfibers as described above, typically the concentration is from 0.2 to 10 weight percent, preferably from 0.3 to 1.5 weight percent.

The polypropylene of the melt-blown microfibers has a Tm of at least about 155° C. and is characterized by having a weight average molecular weight of from about 30,000 to 150,000, preferably 50,000 to 120,000.

The novel acoustical insulation of thermally stable polypropylene melt-blown microfibers is formed by melt-blowing techniques described above where a polypropylene polymer (generally having a weight average molecular weight of greater than 150,000, preferably greater than 170,000) is fed into an extruder to undergo at least partial degradation as is described, for example, in U.S. Pat. No. 3,849,241. Following extrusion and thermal and/or catalytic degradation the polymer is intimately mixed with an antioxidant or thermal stabilizer immediately prior to the die. This mixing can occur in a Kenix® type static mixer as disclosed in U.S. Pat. No. 5,064,578. The temperature in the resin conveying tube containing the static mixer is well below that in the extruder (which is from 350° to 475° C.) and is generally from 280° to 340° C. with the antioxidant or thermal stabilizer having a mean residence time in the resin conveying tube of less than 25 seconds, preferably from 10 to 25 seconds. The blown microfibers are then formed by extruding fibers from the die with the high velocity air flow.

EXAMPLES

Thermal Stability Evaluations

The thermal stability of melt-blown microfiber webs was determined by placing test samples of the web in an oven maintained at 135° C. or 155° C. and monitoring the condition of the samples on a daily basis. Webs having no or low antioxidant levels would shrink, melt, embrittle and show discoloration with increasing time at the test temperature. Web thermal stability was reported as the number of days the web samples substantially maintained their original color, dimensions, and suppleness at the respective temperatures.

Molecular Weight Determination

Molecular weights of the polypropylene before and after aging was determined by standard gel permeation chromatography techniques for determining the molecular weight of polypropylene.

Antioxidant Analysis

Actual antioxidant levels in the webs were determined by adding hexane to a web sample in a sealed sample vial, heating the vial at 125° C. until the web melted (approximately 15 to 20 minutes), mixing to insure homogeneity, cooling the solution to room temperature to precipitate the polymer, and analyzing the hexane solution for antioxidant by standard liquid phase chromatography techniques.

Effective Fiber Diameter (EFD) Determination

The pressure drop of the air passing through the major face of the web and across the web as outlined in test method ASTM F 778-88. The "Average Effective Fiber Diameter" was calculated according to the test method set forth in Davis, C. N., The Separation of Airborne Dust and Particles, Institution of Mechanical Engineers, London, Proceedings 1B, 1952.

Web Production Apparatus

The webs of the present invention were prepared using an apparatus similar to that described in U.S. Pat. Nos. 4,933,229 (Insley et. al.) and 5,064,578 (Insley et. al.), which are incorporated herein by reference. The apparatus was similar to a conventional melt-blown microfiber web production except a resin conveying tube equipped with an injection port located near the inlet end (i.e., the end connected to the extruder) of the tube was used to connect the die to the extruder. The conveying tube contained a static mixer of the type sold as a Kenix® mixer (18 cm in length, 0.94 cm in diameter and having 9 mixing elements or 56 cm in length, 1.58 cm in diameter and having 22 mixing elements) positioned down stream of the injection port and upstream of the outlet end of the tube (i.e., the end connected to the melt-blown microfiber (BMF) die). The injection port of the conveying tube was connected to a heated (about 140° C.) Ruska® positive displacement pump, a grid melter (Meltex GRO, available from Nordsen Co. of Duluth, Ga.), or a second extruder which was used to introduce the antioxidant (or alternatively an antioxidant/polypropylene blend) into the stream of molten polypropylene as it exited the first extruder and entered the conveying tube. The temperature of antioxidant (or antioxidant/polypropylene blend) and its associated feed mechanism (i.e., pump or extruder) was adjusted to a temperature such that the antioxidant was delivered as a liquid stream into the conveying tube without decomposing the antioxidant. The rpm of the pump or second extruder was adjusted to deliver the antioxidant (or antioxidant/polypropylene blend) into the molten stream of resin exiting the first extruder at a rate so as to produce the desired antioxidant level in the polypropylene exiting the BMF die. The combined polypropylene/antioxidant stream was split and recombined several times by the Kenix® type mixer to uniformly incorporate the antioxidant into the polypropylene before it exited the resin conveying tube. After exiting the resin conveying tube the combined molten polypropylene stream was conveyed through the BMF die into a high velocity hot air stream which attenuated the molten polypropylene into microfibers that were subsequently collected on a collector surface. Microfiber diameter was controlled by adjusting, independently or concurrently, the velocity of the attenuating air stream and the flow rate of the polypropylene through the die orifices. Molten polypropylene was typically delivered from the BMF die at a rate of approximately 0.2 or 1.3 kg/hour/cm die width. The temperature of the first extruder barrel was maintained between about 360° C. and 500° C., or at the higher throughput rate, ramped from about 220°–470° C. The temperature of the resin conveying tube was maintained between 310° C. and 315° C., and the temperature of the BMF die was maintained between about 310°–360° C. and 370° C. The primary air supply was maintained at a temperature of approximately 400° C. and a pressure of approximately 70 kPa. Extrusion conditions were typically adjusted to produce a maximum residence time of the antioxidant in the resin conveying tube of approximately 22 seconds or less at the lower throughput rate and approximately 10 seconds or less at the higher throughput rate.

Examples 1 through 8 and Control Example C-1

High temperature stable polypropylene BMF acoustical insulation webs of the present invention were prepared according to the above described procedure using Exxon 3505 polypropylene resin (available from Exxon Chemicals, Dallas, Tex.), and Irganox® 1010 (tetrakis[methylene (3,5-di-tert-butyl-4-hydroxyhydrocinnamate)]methane, a high molecular weight phenolic antioxidant, available from the Additives Div., Ciba-Geigy Corp., Hawthorne, N.Y.) at input loading levels were as indicated in Table 1 (actual antioxidant levels in the BMF web were somewhat lower due to slight decomposition or other losses). Polypropylene resin was delivered from the BMF die at a rate of approximately 0.2 kg/cm/hr, the Kenix® type mixer was 18 cm in length, 0.94 cm in diameter and had 9 mixing elements and the Irganox® 1010 was introduced into the resin conveying tube, by means of a Ruska® positive displacement pump, in the calculated weight percent shown in Table 1. The BMF webs had a basis weight of approximately 110 g/m$^2$ and an average effective fiber diameter of approximately 5.6–8.8, determined as described above. Control example C-1 was prepared using substantially the same procedure except that no antioxidant was introduced into the molten polypropylene stream as it passed through the conveying tube.

TABLE 1

| Example | Irganox ™ 1010 Loading (weight percent) | Stability at 155° C. (days) |
| --- | --- | --- |
| 1 | 0.1 | 0.5 |
| 2 | 0.25 | 0.5 |
| 3 | 0.50 | 11 |
| 4 | 0.75 | 26 |
| 5 | 1.0 | 24 |
| 6 | 1.5 | 32 |
| 7 | 2.0 | 35 |
| 8 | 3.0 | 32 |
| C-1 | 0 | 0.5 |

Examples 9 through 14 and Control Example C-2

Examples 9 through 14 and Control C-2 were prepared in substantially the same manner as described for Examples 1 through 8 and C-1 except that the polypropylene resin used was Fina 3860 (available from Fina Corp., Dallas Tex.), the polypropylene was delivered from the BMF die at a rate of approximately 0.72 kg/cm/hr, the Kenix® type mixer was 56 cm in length, 1.58 cm in diameter, and had 22 mixing elements, and the antioxidants were introduced into the resin conveying tube by a grid melter. Examples 10, 12 and 14 incorporated approximately 35 percent by weight 6 denier crimped polyester (polyethylene terephthalate) staple fibers (3.8 cm in length) into the BMF webs using a procedure similar to that described in U.S. Pat. No. 4,118,531 (Hauser) which is incorporated herein by reference. Actual antioxidant levels in the BMF webs and the molecular weight of the polypropylene were determined as described above after formulation and prior to accelerated aging.

TABLE 2

| Ex. | Irganox ™ 1010 Loading (weight percent) | Irganox ™ 1010 Actual (weight percent) | Stability at 135° C. (days) | Stability at 155° C. (days) | MW After Extrusion | MW After 26 Days At 155° C. |
|---|---|---|---|---|---|---|
| 9 | 0.5 | 0 | 4 | 1 | 89,800 | — |
| 10 | 0.5 | 0 | 4 | 1 | 89,800 | — |
| 11 | 1.0 | 0.34 | >160 | 49 | 95,300 | 94,900 |
| 12 | 1.0 | 0.34 | >160 | 46 | 95,300 | — |
| 13 | 2.0 | 1.35 | >160 | 85 | 94,400 | 97,800 |
| 14 | 2.0 | 1.35 | >160 | 51 | 94,400 | — |
| C-2 | — | — | 4 | 1 | 97,800 | — |

Example 15 and Comparative Example Comp-1

The BMF web for Example 15 was prepared substantially as described for Example 5. The extruder barrel temperature was controlled at 360° C., Irganox® 1010 was injected at a 1 weight percent level, the web had a basis weight of 200 g/m², and the average EFD of the fibers was 8.2 μm. Subsequent analysis for the actual Irganox® 1010 level in the web indicated a 0.66 weight percent level. Comparative Example Comp-1 was prepared in a similar manner to Example 15 except that the Irganox® 1010 was loaded in the hopper of the extruder as a 1 weight percent pre-blend with the polypropylene pellets instead of being injected into the resin conveying tube. The thus produced BMF web had a basis weight of 193 g/m², an average EFD of 7.6 μm and analysis for the actual Irganox® 1010 level indicated a 0.21 weight percent level.

We claim:

1. A thermally stable acoustical insulation microfiber web for attenuation of sound waves comprising a melt-blown polypropylene microfiber web having an average effective fiber diameter of less than about 15 microns, a thickness of at least about 0.5 cm, a density of less than 50 kg/m³ and a pressure drop of at least about 1 mm water at a flow rate of about 32 liters/min., said polypropylene microfibers formed of polypropylene homopolymers, copolymers or blends thereof with a nonvolatile thermal stabilizer or antioxidant is uniformly distributed throughout the microfibers such that the microfibers are thermally stable for at least 10 days at 135° C.

2. The thermally stable acoustical insulation microfiber web for attenuation of sound waves of claim 1 wherein the microfibers are thermally stable for at least 50 days at 135° C.

3. The thermally stable acoustical insulation microfiber web for attenuation of sound waves of claim 1 wherein the microfibers have from 0.2 to 5 weight percent of the thermal stabilizer or antioxidant.

4. The thermally stable acoustical insulation microfiber web for attenuation of sound waves of claim 1 wherein the microfibers have from 0.3 to 1.5 weight percent of a thermal stabilizer or antioxidant uniformly distributed throughout the microfibers.

5. The thermally stable acoustical insulation microfiber web for attenuation of sound waves of claim 3 wherein the thermal stabilizer or antioxidant comprise a hindered phenol.

6. The thermally stable acoustical insulation microfiber web for attenuation of sound waves of claim 5 wherein the hindered phenol comprises tetrakis[methylene(3,5-di-tert-butyl-4-hydroxyhydrcinnamate)]methane.

7. The thermally stable acoustical insulation microfiber web for attenuation of sound waves of claim 1 wherein the melt-blown microfiber polypropylene has a weight average molecular weight of from 30,000 to 150,000.

8. The thermally stable acoustical insulation microfiber web for attenuation of sound waves of claim 1 wherein the melt-blown microfiber polypropylene has a weight average molecular weight of from 50,000 to 130,000.

9. The thermally stable acoustical insulation microfiber web for attenuation of sound waves of claim 1 further comprising a second layer bonded to the melt-blown microfiber web, said second layer comprising a scrim, nonwoven fibrous web, film or woven fabric.

10. The thermally stable acoustical insulation microfiber web for attenuation of sound waves of claim 1 wherein the average effective fiber diameter is from about 1 to 10 microns.

11. The thermally stable acoustical insulation microfiber web for attenuation of sound waves of claim 1 wherein the web has a density of less than about 20 kg/M³.

12. The thermally stable acoustical insulation microfiber web for attenuation of sound waves of claim 1 wherein the melt-blown microfiber web comprises a mixture of melt-blown microfibers and crimped bulking fibers.

13. The thermally stable acoustical insulation microfiber web for attenuation of sound waves of claim 12 wherein the melt-blown microfibers comprise at least 40 weight percent of the melt-blown microfiber web.

14. The thermally stable acoustical insulation microfiber web for attenuation of sound waves of claim 13 further comprising microfiber microwebs.

15. The thermally stable acoustical insulation microfiber web for attenuation of sound waves of claim 1 wherein the microfibers are thermally stable for at least 5 days at 155° C.

16. The thermally stable acoustical insulation microfiber web for attenuation of sound waves of claim 1 wherein the microfibers are thermally stable for at least 30 days at 155° C.

17. The thermally stable acoustical insulation web for attenuation of sound waves of claim 1 provided as a panel adapted to be secured to an article.

* * * * *